United States Patent
Hsu et al.

(10) Patent No.: US 10,250,596 B2
(45) Date of Patent: Apr. 2, 2019

(54) MONITORING ENCRYPTED COMMUNICATION SESSIONS

(71) Applicant: International Business Machines Corporation, Armonk, NY (US)

(72) Inventors: Sheng-Tung Hsu, Taipei (TW); Cheng-Ta Lee, Taipei (TW); Wei-Shiau Suen, Taichung (TW); Ming-Hsun Wu, New Taipei (TW); Rick M. F. Wu, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 61 days.

(21) Appl. No.: 15/196,621

(22) Filed: Jun. 29, 2016

(65) Prior Publication Data
US 2018/0007038 A1 Jan. 4, 2018

(51) Int. Cl.
*H04L 29/06* (2006.01)
*H04L 29/08* (2006.01)

(52) U.S. Cl.
CPC ...... *H04L 63/0853* (2013.01); *H04L 63/0254* (2013.01); *H04L 63/0428* (2013.01);
(Continued)

(58) Field of Classification Search
CPC ............. H04L 63/0853; H04L 63/0254; H04L 63/0428; H04L 63/0807; H04L 63/1416;
(Continued)

(56) References Cited

U.S. PATENT DOCUMENTS 7,480,794 B2 * 1/2009 Kersey ................ H04L 63/0428
370/351
7,577,132 B2 * 8/2009 Katz ................... H04L 61/1523
370/352
(Continued)

FOREIGN PATENT DOCUMENTS

WO 2013112816 A1 8/2013

OTHER PUBLICATIONS

Salowey et al., "Transport Layer Security (TLS) Session Resumption without Server-Side State," Network Working Group, Request for Comments 5077, Jan. 2008, 20 pages.
(Continued)

*Primary Examiner* — Techane Gergiso
(74) *Attorney, Agent, or Firm* — Jared C. Chaney (57) ABSTRACT

A method for monitoring encrypted communication sessions between computing devices includes intercepting messages of a handshaking procedure between a client and a server device, the handshaking procedure establishing an encrypted communication session between the client and server. The method further includes determining, from the messages, a session context for the encrypted session and an identifier associated with the session context. The method further includes storing the session context in a database indexed by the identifier. The method further includes intercepting, subsequent to the storing, second messages of a second handshaking procedure between the client and a second server device, the where second handshaking procedure resumes the encrypted communication session after an interruption. The method additionally includes determining that the second messages includes the identifier associated with the session context, retrieving, from the database, the session context using the identifier, and monitoring the resumed encrypted communication session using the session context.

20 Claims, 4 Drawing Sheets

(52) U.S. Cl.
CPC ...... *H04L 63/0807* (2013.01); *H04L 63/1416* (2013.01); *H04L 63/166* (2013.01); *H04L 63/168* (2013.01); *H04L 67/145* (2013.01); *H04L 67/146* (2013.01)

(58) Field of Classification Search
CPC ... H04L 63/166; H04L 63/168; H04L 67/145; H04L 67/146
See application file for complete search history.

(56) References Cited

U.S. PATENT DOCUMENTS

| | | | |
|---|---|---|---|
| 7,953,861 | B2 | 5/2011 | Yardley |
| 9,124,629 | B1* | 9/2015 | Bowen ................ H04L 63/168 |
| 9,166,862 | B1 | 10/2015 | Davis et al. |
| 9,300,629 | B1* | 3/2016 | Jahr ...................... H04L 63/02 |
| 9,923,923 | B1* | 3/2018 | Sharifi Mehr ....... H04L 63/166 |
| 10,051,001 | B1 | 8/2018 | Ashley ................. H04L 63/20 |
| 2005/0050316 | A1 | 3/2005 | Peles |
| 2005/0149718 | A1* | 7/2005 | Berlin ................ H04L 63/0442 |
| | | | 713/151 |
| 2006/0165060 | A1* | 7/2006 | Dua ...................... G06Q 20/20 |
| | | | 370/352 |
| 2007/0165572 | A1* | 7/2007 | Lenzarini .......... H04L 29/12396 |
| | | | 370/331 |
| 2008/0040484 | A1 | 2/2008 | Yardley |
| 2011/0231651 | A1* | 9/2011 | Bollay ................ H04L 63/166 |
| | | | 713/152 |
| 2013/0198509 | A1 | 8/2013 | Buruganahalli et al. |
| 2015/0288679 | A1* | 10/2015 | Ben-Nun ............. H04L 67/141 |
| | | | 726/10 |
| 2015/0381578 | A1* | 12/2015 | Thota ...................... G09C 1/00 |
| | | | 713/168 |
| 2016/0014152 | A1 | 1/2016 | Buruganahalli et al. |
| 2016/0048685 | A1 | 2/2016 | Adam et al. |
| 2016/0063131 | A1 | 3/2016 | Kuscher et al. |
| 2016/0261632 | A1* | 9/2016 | Kolhi ................... H04L 9/0819 |
| 2016/0315913 | A1 | 10/2016 | Lu et al. |

OTHER PUBLICATIONS

Salowey et al., "Transport Layer Security (TLS) Session Resumption without Server-Side State," Network Working Group, Request for Comments 4507, May 2006, 17 pages.
List of IBM Patents or Patent Applications Treated as Related, Dated Jun. 26, 2018, 2 pages.
International Search Report and Written Opinion for International Application No. PCT/IB2018/053877 dated Sep. 29, 2018.

* cited by examiner

MONITORING ENCRYPTED COMMUNICATION SESSIONS

STATEMENT REGARDING PRIOR DISCLOSURES BY THE INVENTOR OR A JOINT INVENTOR

Aspects of the present invention have been disclosed by the Applicant, who obtained the subject matter directly from the inventors, in the product IBM Security Network Protection 5.3.2, made available to the public on Nov. 19, 2015.

BACKGROUND

The present disclosure relates to computer networks, and more specifically, to monitoring encrypted communication sessions based on transport layer security session identifiers and session tickets.

Encrypted communication sessions allow network connected computing devices to communicate with a degree of privacy. The privacy may be afforded by the use of cryptographic keys shared between the communicating devices to ensure that only participants of the communication can decrypt a communicated message. Establishing encrypted communication sessions may add a costs to network communications due to, inter alia, additional messages that must be communicated to exchange or synchronize cryptographic keys and other information between communicating devices before encrypted messages can be communicated.

SUMMARY

According to embodiments of the present disclosure, a method for monitoring encrypted communication sessions between computing devices include intercepting first messages of a handshaking procedure between a client device and a first server device, where the handshaking procedure establishes an encrypted communication session between the client and first server devices. The method then includes determining, from the first messages, a session context for the encrypted communication session and an identifier associated with the session context. The method then includes storing the session context in a database indexed by the identifier. The method further includes intercepting, subsequent to the storing, second messages of a second handshaking procedure between the client device and a second server device, the where second handshaking procedure resumes the encrypted communication session after an interruption. The method additionally includes determining that the second messages includes the identifier associated with the session context and retrieving, from the database, the session context using the identifier. The method then includes monitoring the resumed encrypted communication session using the session context.

Other embodiments are directed systems and computer program products for monitoring messages from encrypted communications sessions.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to computer networks, more particular aspects relate to monitoring encrypted communication sessions between network connected computing devices. While the present disclosure is not necessarily limited to such applications, various aspects of the disclosure may be appreciated through a discussion of various examples using this context.

Some techniques for configuring encrypted communication sessions, and thus providing for communication security between computing devices in using data communication networks, include the use of session based authentication protocols. Session based authentication protocols provide a mechanism for network connected computing devices to, inter alia, establish their identities to each other and exchange ephemeral or persistent secret information (e.g., pre-master keys) for generating cryptograph keys to secure future communications. Transport layer security (TLS) is a class of session authentication protocols used for establishing encrypted communication sessions over the internet. Transport layer security protocols enable encrypted communication between computing devices in network communication layers above the transport layer of the Open Systems Interconnection (OSI) model. An enabling component of TLS protocols is the establishment of a session context between communicating devices. The session context may contain information to enable communicating devices to, for example, encrypt/decrypt, authenticate, and verify the integrity of, messages exchanged during secure communication sessions. The information contained in a session context may include cipher suites, pre-master keys, and other TLS related information. A new session context may be established between, or associated with, computing devices for each encrypted communication session negotiated or configured between the devices.

Establishing TLS based encrypted communication sessions may include the execution of a handshaking process or protocol requiring the exchange of four messages between, for example, client and server computing devices. In some applications, this communication overhead may be significant. TLS session resumption is an addition to TLS protocols which reduce the handshaking overhead by enabling client and server devices to resume encrypted communications using a previously established session after an abbreviated handshake (e.g., a handshake consisting of less than four messages exchanges).

Transport layer security provide two protocols to support session resumption: Session ID and Session Ticket. Using the Session ID protocol, each communicating device (e.g., client and server devices) stores a copy of a session context associated with an encrypted communication session. A client device may resume an encrypted communication session by transmitting (e.g., in a handshaking process) to a server device, inter alia, a plain text (e.g., unencrypted) session ID associated with a previously established session and whose session context will be used to secure (e.g., encrypt) forthcoming messages. The server may then use the received session ID to retrieve the associated session context from a database of stored session contexts. A client, may also resume an encrypted communication session by transmitting an encrypted session ticket, inter alia, in a handshaking process to a server device. The encrypted session ticket may include a session context from a previously established encrypted communication session. The session ticket, stored only by the client, may contain all required information, in encrypted form, to resume a communication session.

Institutions that host computing devices capable of communicating using encrypted messages may use monitoring or security enforcement devices that intercept or eavesdrop on communication sessions to, for example, regulate network usage or detect anomalies in network communications (e.g., to detect evidence of, for example, an attack on, or an intrusion into, a communication network). These monitoring or security enforcement devices (hereinafter, "monitoring devices") may require access to the decrypted contents messages intercepted from the encrypted communication sessions to execute their monitoring or regulation functions. Monitoring devices may gain access the contents of messages transmitted in encrypted communication sessions by intercepting and storing session context information exchanged between the devices during the handshaking procedures executed to establish encrypted communication sessions. Maintaining access to the messages after a TLS session resumption, however, may be difficult because of disparate session resumption techniques enabled by the session ID and session ticket protocols.

Embodiments of this disclosure are based on the recognition that both the Session ID and Session Ticket protocols support session resumption by, inter alia, mapping a string identifier to a TLS session context. The Session ID protocol, for example, maps a session ID string to a TLS session context stored on a server device, while the Session Ticket protocol maps an encrypted session ticket (e.g., an encrypted string) to a session context stored on client devices and in the encrypted session ticket. Embodiments of the present disclosure provide an architecture (e.g., systems, methods, and computer program products) for enabling monitoring (e.g., passive inspection, or analysis) of messages intercepted from encrypted communication sessions by associating TLS session contexts intercepted during full TLS handshaking procedures with either a session ID or a session ticket. The session context may then be stored in database indexed by either the associated session ID or session ticket. Subsequently, during a TLS session resumption, a session ID or session ticket intercepted during an abbreviated TLS handshake procedure may be used to retrieve a stored session context, associated with the resumed encrypted communication session, and use it to decrypt messages intercepted during the resumed session.

As used herein, the phrase to "intercept messages" and it's variants means that messages communicated between a first device and a second device may be observed, recorded, and otherwise captured by a third party. In some embodiments, messages may be passively intercepted by a third party without disrupting the communication between the first party and the second party.

As used herein, a client device may be a computing device that initiates a communication session with a second device. A server device may a computing devices which receives requests to initiate communication sessions. In some embodiments, however, server devices may initiate communication session with a client devices.

As used herein, the phrase "session context" refers to data or data structures specified by one or more TLS protocols for use in enabling a communication session between parties. The session context for an encrypted TLS communication session, for example, may include a cipher suit including cryptographic algorithms used to encrypt and decrypt messages, a pre-master key for generating shared cryptographic keys, a master key for encrypting a data payload, and other information for supporting encrypted communication sessions. The session context of encrypted TLS communication sessions may further include the shared keys used for encrypting and decrypting messages. Computing devices have access to the session context of an encrypted communication session may decrypt encrypted messages exchanged in the communication session.

As used herein, the phrase "TLS handshake" and other variants relate to handshaking procedures or protocols defined by TLS protocols for establishing encrypted TLS communication sessions. Handshaking procedures may include sequences of messages communicated between parties to exchange data or data structures required to establish or associate a session context with an encrypted communication session. A full TLS handshake, for example, may include the exchange of messages specified for parties to agree on a cipher suite, share common secrets for key generation, and exchange identifiers associated with an encrypted communication session. TLS protocols additionally support an abbreviated version of the full TLS handshake for session resumption. According to this abbreviated TLS handshake, only messages needed to authenticate or otherwise associate a previously established communication session with communicating parties are exchanged during a session resumption procedure.

As used herein, Session ID is a TLS protocol which supports TLS session resumption through the use of an identifier string (e.g., a session ID) transmitted to, for example, a client device by a server device during the establishment TLS that is being resumed. During the session resumption abbreviated handshake, a client device transmits a stored copy of the session ID to a server device. The session ID may be used by the client and server devices to retrieve or reference a TLS session context previously established by a full TLS handshake and stored on each respective device. The retrieved session context may then be used to resume a previously suspended or interrupted encrypted communications session.

As used herein, Session Certificate is a TLS protocol which supports TLS session resumption through the use of an encrypted session ticket transmitted to, for example, a client device by a server device. The encrypted session ticket may include a session context associated with a previously established encrypted communication session between the client and server devices. In some embodiments, the session ticket may be encrypted by the server using a private key.

Figure 1:
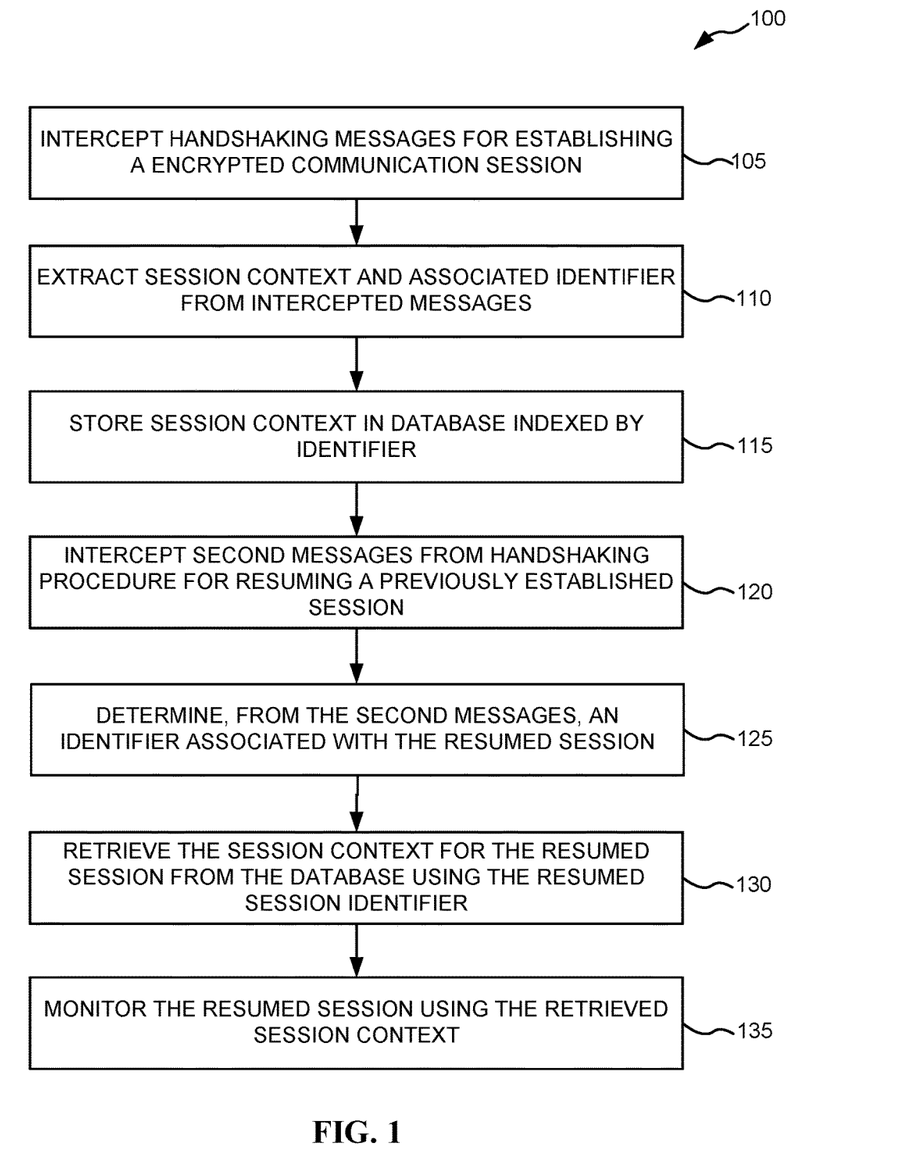
FIG. 1 depicts a flowchart of a computer implemented method for monitoring encrypted communication sessions, according to various embodiments.
Figure 4:
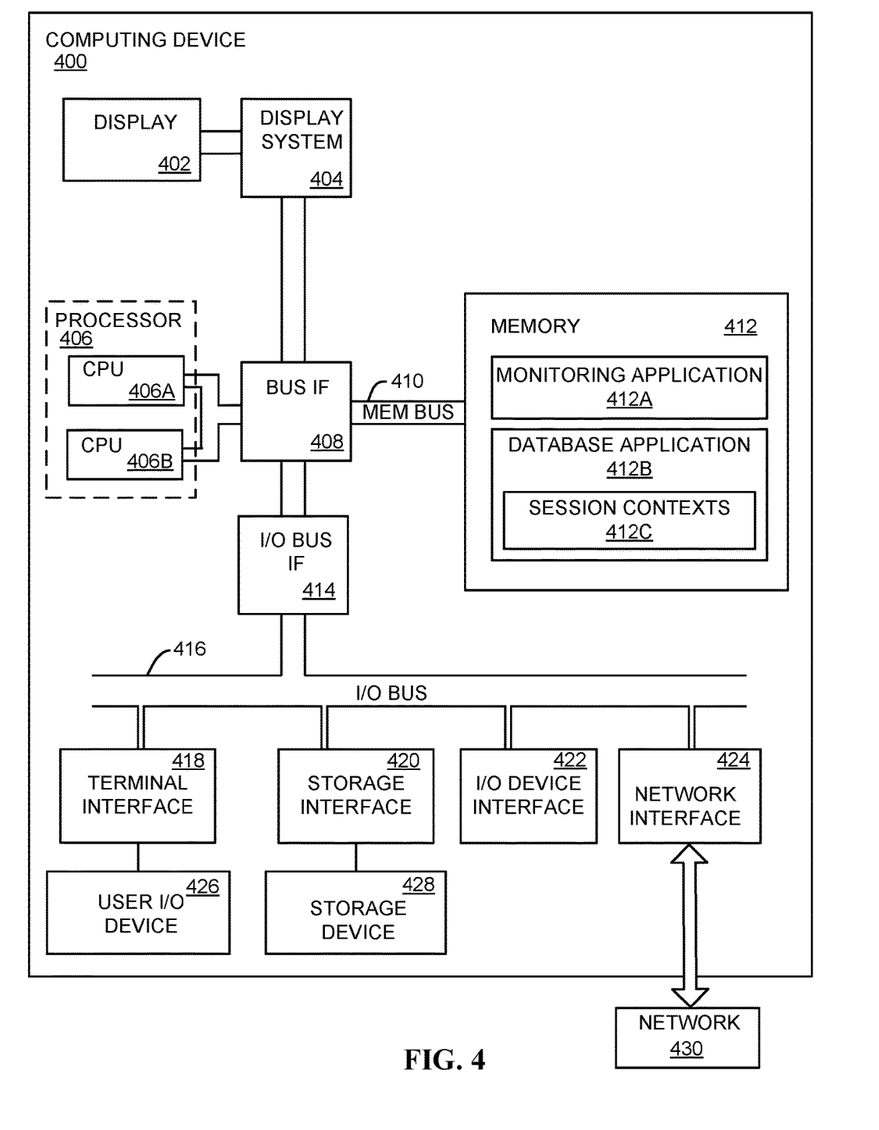
FIG. 4 depicts a block diagram of an example computing device that may implement the systems and methods of the present disclosure to monitor encrypted communication sessions, according to various embodiments.

Referring now to the figures, FIG. 1 depicts a flowchart 100 of a computer implemented method for monitoring encrypted communication sessions, according to various embodiments. In some embodiments, the operations of the flowchart 100 may be executed to monitor intercepted messages of encrypted communication sessions after a TLS session resumption. Operations of the flowchart 100 may be performed by software and/or firmware applications executing on a processor of a monitoring or security enforcement computing device (hereinafter, "the motoring system"). In some embodiments, the monitoring system may be a computing system such as the computing device 400 (FIG. 4). The monitoring system may be deployed in-line between two communicating devices and may observe communicated messages as they pass through a communication channel. The monitoring system may be further deployed as a device connected to a communication switch via a port (e.g., a span port) configured to received mirrored or relayed packets exchanged through other ports forming a communication channel between two communicating devices.

The monitoring system may begin the operations of flowchart 100 by executing operation 105 to intercept messages (e.g., first messages) from a handshaking procedure for establishing an encrypted communication session. In some embodiments, the intercepted messages may include the messages of a full TLS handshake, as described herein. In some embodiments, the monitoring system may intercept the messages by executing one or more software (or firmware) routines to cause a networking device (e.g., a network interface card) to capture the messages from a shared multiple access channel (e.g., a multiple access channel accessible to both the monitoring system and the devices establishing the encrypted communication session). In certain embodiments, the monitoring system may intercept the messages by executing one or more software or firmware routines to cause a computing device having access to the communicated messages to forward the messages to the monitoring system. In some embodiments, intercepting the messages may further include receiving messages transmitted from, from example, the server device to the monitoring system.

The monitoring system may continue the operations of flowchart 100 by executing operation 110 to extract the session context for the encrypted communication session from the intercepted messages. Extracting the session context may include executing one or more software or firmware routines to determine, for example, a cipher suite agreed upon by the parties, a share secret, and cryptograph keys used for encryption and decryption. Operation 110 may be further executed to extract or determine an identifier (e.g., a session context identifier or indexer) of the communication session or the associated session context. The session context identifier may be a plain text session ID or an encrypted session ticket, as described herein.

The monitoring system may continue the operations of flowchart 100 by executing operation 115 to store the session context in a database indexed by the session context identifier extracted in operation 110. In some embodiments, the session context identifier may be transformed by, for example, a hash function to generate a formatted or secondary identifier that may be used to determine the location of a session context stored in a database. The plain text session ID generated by a server device using the Session ID TLS protocol, for example, may be hashed (e.g., transformed by a hash function) determine the formatted identifier. Similarly, the encrypted session ticket generated by a server device using the Session Ticket TLS protocol may be hashed to determine the formatted identifier. In some embodiments, the original (e.g., un-hashed or transformed) session ID and session ticket may be used without hashing to index the session context.

The session context stored in operation 115 may be used to monitor messages exchanged by the devices in the encrypted communication session established by the handshaking operations intercepted in operation 105.

The monitoring system may continue the operations of flowchart 100 by executing operation 120 to intercept a second set of messages (e.g., second messages) from a handshaking procedure for resuming a previously established encrypted communication session. The second set of messages may be part of an abbreviated TLS handshaking procedure, as described herein. In some embodiments, the second set of messages may include the transmission of a session ID or an encrypted session ticket from a client device to a server device.

The monitoring system may continue the operations of flowchart 100 by executing operation 125 to determine, from the second set of messages, an identifier associated with the resumed session (e.g., a session context identifier). In some embodiments resumed session identifier may be the session ID or session ticket transmitted by a client device to a server device in the abbreviated TLS handshake. In certain embodiments, the resumed session identifier may be a transformed (e.g., hashed, and/or augmented) version of the session ID or session ticket transmitted by the client in the abbreviated TLS handshake.

The monitoring system may continue the operations of flowchart 100 by executing operation 130 to retrieve the session context for the resumed encrypted communication session. The session context may be retrieved from a database or database management system accessible to the monitoring system by executing on or more software routines to determine the location of the session context in the database based on the resumed session identifier. Additional routines may then be executed to parse a memory, storage system, or storage device to retrieve the session context.

The operations of flowchart 100 may be further continued by executing operation 135 to monitor the resumed communication session using the session context retrieved in operation 130. Monitoring the resumed communication session may include executing one or more routines to intercept encrypted messages exchanged during the communication session. The monitoring may further include using the retrieved session context to decrypt and inspect the intercepted messages.

In some embodiments, a client device may establish an encrypted communication session with a first server device using the full handshake procedure intercepted in operation 105. The same client device may later initiate the abbreviated handshake procedure intercepted in operation 120 to resume the previously established communication session (e.g, after an interruption or suspension) with a second server (e.g., because the first server is overloaded or otherwise unavailable). The architecture described herein, and in particularly the method described in flowchart 100, enables the monitoring system to continue monitoring the encrypted messages communicated between the client and second server when the session context from the previously established communication session is reused in the resumed communication session.

In some embodiments, the session context may be updated after session resumption. Updating the session context may include, for example, changing cryptographic keys or cipher suites. Updates to the session context may be communicated during the abbreviated session resumption handshake, and thus the monitoring system may access these updates and use them update the retrieved session context.

Figure 2:
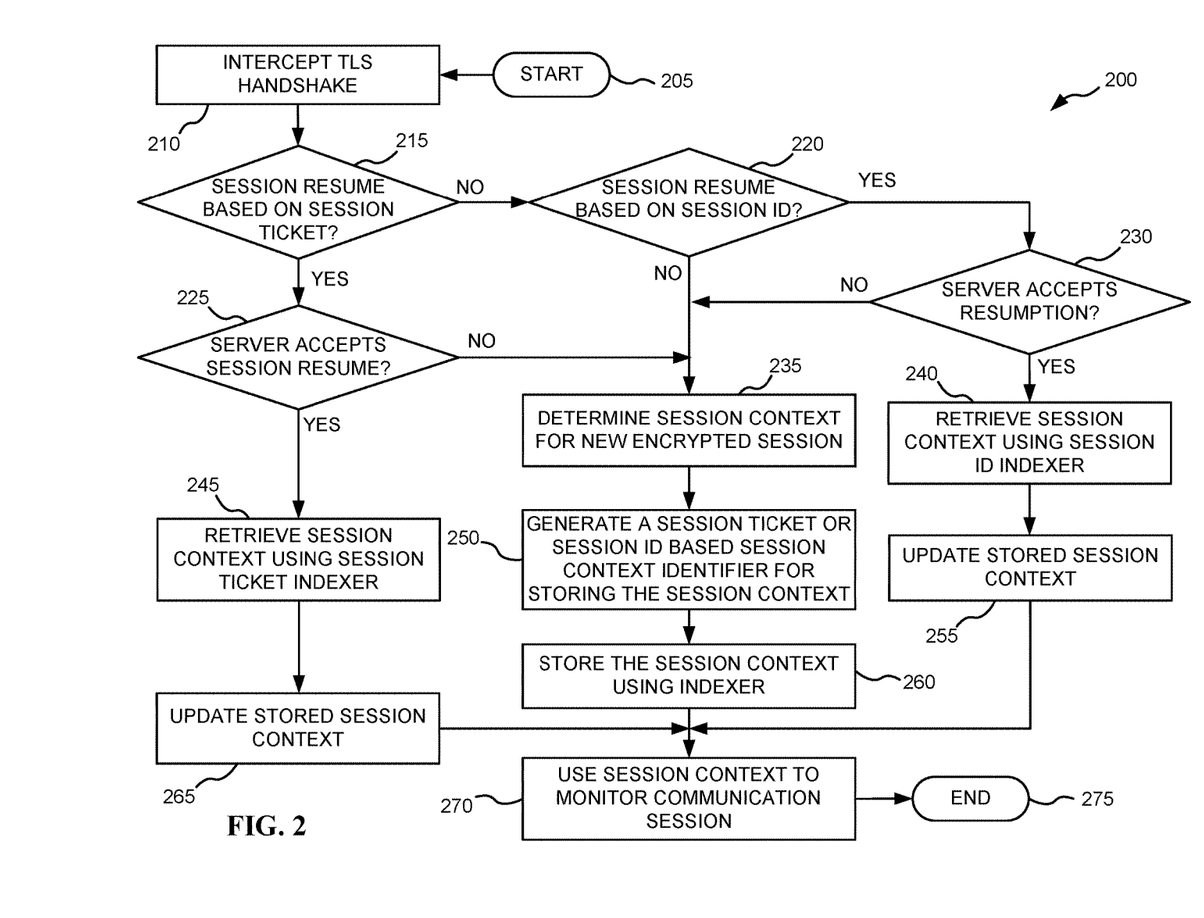
FIG. 2 depicts a flowchart of an example embodiment of a computer implemented method for monitoring encrypted communication sessions using transport layer security session identifiers and session tickets, according to various embodiments.

FIG. 2 depicts a flowchart 200 of an example embodiment of a computer implemented method for monitoring encrypted communication sessions using transport layer security session identifiers and session tickets, according to various embodiments. The operations of flowchart 200 may be executed by a monitoring system, as described herein. Furthermore, the operations of flowchart 200 may be executed to enable the monitoring system to monitor messages of encrypted TLS communication sessions is a way that may be agnostic to the type of TLS resumption protocol used by the communicating devices.

The monitoring system may begin the operations of flowchart 200 at operation 205 by executing operations and configuring devices to intercept messages communicated on a data communication network, as described herein.

The monitoring system may continue the operations of flowchart 200 at operation 210 by intercepting a set (e.g., one or more) of messages of a TLS handshake for establishing or resuming an encrypted communication session, as described herein. At operation 215, the monitoring system may determine, based on the intercepted messages, whether the encrypted communication session supports session resumption using a TLS Session Ticket protocol. In some embodiments, the monitoring system may determine that the communication session supports a Session Ticket protocol by executing one or more software routines to parse the message intercepted in operation 210 to determine whether a "client hello" message in the set of intercepted messages includes a session ticket. When the client hello message includes a session ticket, the monitoring system may continue to operation 225, while the monitoring system may proceed to operation 220 when the client hello message does not include a session ticket.

At operation 225, the monitoring system may determine whether the server accepts the client's session ticket (e.g., the client's request to resume a previously established encrypted communication session) by, for example, determine whether the server transmitted a "change cipher spec" message before transmitting a "server hello done" message in the set of intercepted handshaking messages. The server accepts the session resumption request, and the monitoring system may continue to operation 245, when the server transmits a change cipher spec message before transmitting a server hello done message. Conversely, the server rejects the session resumption, and the monitoring system may proceed to operation 235, when the change cipher spec message is not transmitted before the server hello done message.

Per operation 245, the monitoring system may use the encrypted session ticket transmitted by the client and intercepted in operation 210 to retrieve the session context associated with the resumed TLS session. The session context may be retrieved from a database and database management system, as described herein. In some embodiments, the monitoring system may execute operation 265 to update the retrieved session context with any changes to the session context prescribed by the client or the sever device during the TLS session resumption handshake.

The storage system may continue the operations of the flowchart 200 by executing operation 270 to use the session context to monitor the communication session. The operations of the flowchart 200 may then end at operation 275.

Returning to operation 220, the monitoring system may determine, based on the intercepted messages, whether a previously established encrypted communication session is being resumed using the TLS Session ID protocol by, for example, determining whether a session ID field in an intercepted client hello message is empty (e.g., no session ID included in the field). The monitoring system may continue to operation 230A to resume a previously established encrypted communication session when the session ID field is non-empty. Alternatively, the monitoring system may proceed to operation 235 when the session ID field in the client hello message is empty.

At operation 230, the monitoring system may determine whether the server accepts the client's request to resume a previously established encrypted communication session using the transmitted session ID by, for example, determine whether the server transmitted an identical session ID in a "server hello" message in the set of intercepted handshaking messages. The server accepts the session resumption request, and the monitoring system may continue to operation 240, when the server transmits an identical session ID in the server hello message. Conversely, the server rejects the session resumption, and the monitoring system may proceed to operation 235, when the server transmits a different session ID in the server hello message.

Per operation 240, the monitoring system may use the session ID transmitted in the client hello (or, equivalently, the session ID transmitted in the server hello) to retrieve the session context associated with the resumed TLS session. The session context may be retrieved from a database and database management system, as described herein. In some embodiments, the monitoring system may execute operation 255 to update the retrieved session context with any changes to the session context prescribed by the client or the sever device during the TLS session resumption handshake. The monitoring system may then continue to operation 270.

Returning to operation 235, the monitoring system may determine that the TLS handshaking messages intercepted in operation 210 includes messages for establishing a new encrypted communication session between client and server devices. The monitoring system may execute operation 235 to determine the session context for the new encrypted communication session, as described herein. The monitoring system may then execute one or more software routines to operate on an area of memory containing the intercepted messages to parse the messages and identify a plaintext session ID or encrypted session ticket associated with the new encrypted communication session. In some embodiments, the monitoring system may then execute operation 250 to use plain text session ID or encrypted session ticket to generate a session context identifier, as described herein.

At operation 260, the monitoring system may store the session context obtained in operation 235 in a database indexed by the session context identifier generated in operation 250. The monitoring system may then execute operation 270 to use the obtained session context to monitor encrypted message intercepted from the new encrypted communication session.

Figure 3:
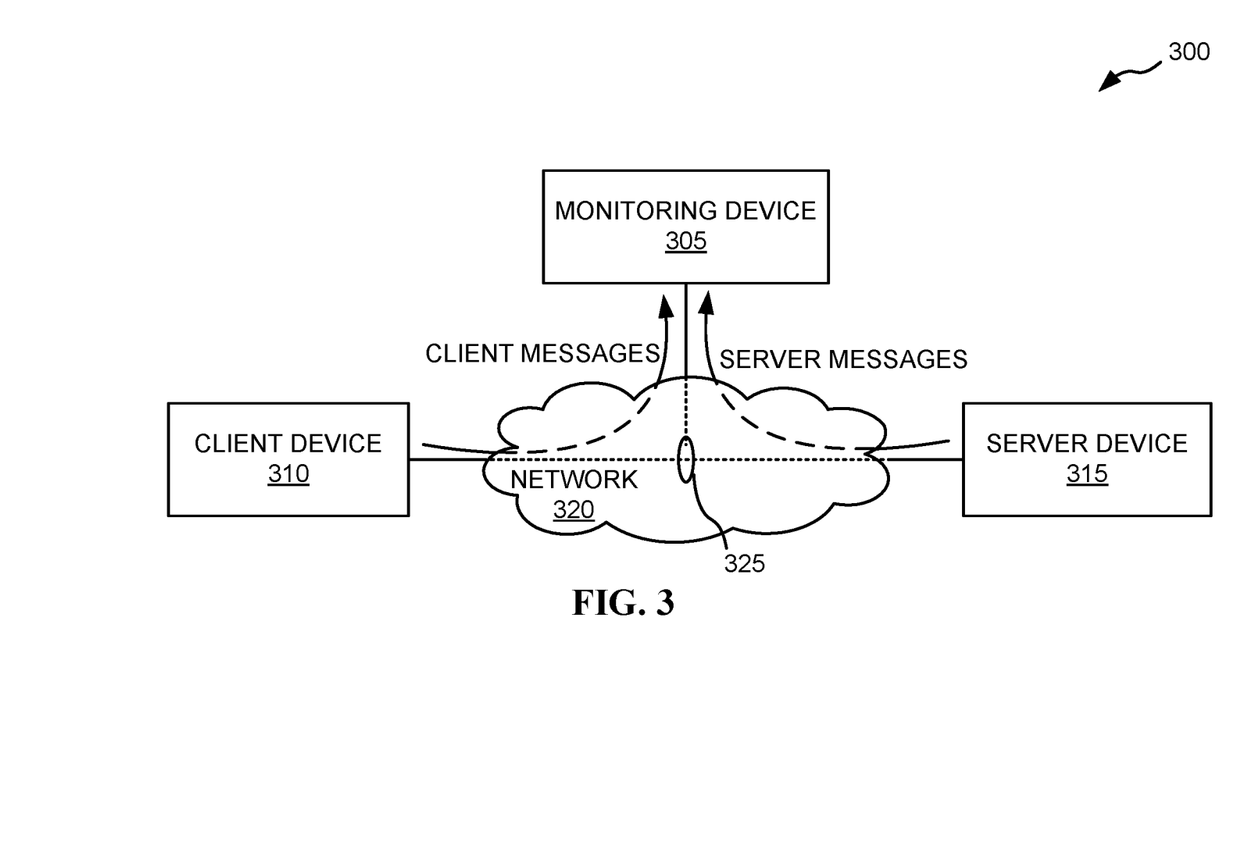
FIG. 3 depicts a block diagram of an example network environment including a system for monitoring encrypted communication sessions, according to various embodiments.

FIG. 3 depicts a block diagram of an example network environment 300 including a system 305 for monitoring encrypted communication sessions, according to various embodiments. The network environment includes monitoring device 305, client device 310, server device 315, and data communication network 320.

The monitoring device 305 may a computing device (e.g., the computing device 400 in FIG. 4) having one or more processors, and a memory storing computer code executable by the one or more processors to perform or execute the methods and operations for passively inspecting or monitoring encrypted communication messages described in the present disclosure.

The client device 310 and server device 315 may be computing devices having one or more processors, and a memory storing computer code executable by the one or more processors to, inter alia, establish encrypted communication sessions (e.g. encrypted TLS communication sessions) and exchange encrypted messages using session context information, as described herein.

The network 320 may be a wireless, optical, or other multiple access data communication network implementing one or more layers (including, for example, the transport layer) of the OSI model. The network tap point 325 may any device, protocol, or construct that enables monitoring device 305 to passively (e.g., without interfering or otherwise disrupting the communication between the client and server devices) intercept messages transmitted by the client device 310 (e.g., client messages) and the server device 315 (e.g., server messages). In some embodiments, the tap point 325 may a connection to a network interface card having access to the network 320. In particular embodiments, the monitoring device 305 may be deployed in-line between client device 310 and server device 315. In these embodiments, tap point 325 may indicate network interfaces coupling the monitoring device 305 between logically (or physically) in a communication channel between client device 310 and server device 315.

FIG. 4 depicts a block diagram of an example computing device 400 that may implement that systems and methods of the present disclosure to monitor encrypted communication sessions, according to various embodiments. The components of the computing device 400 can include one or more processors 406, a memory 412, a terminal interface 418, a storage interface 420, an Input/Output ("I/O") device interface 422, and a network interface 424, all of which are communicatively coupled, directly or indirectly, for inter-component communication via a memory bus 410, an I/O bus 416, bus interface unit ("IF") 408, and an I/O bus interface unit 414.

The computing device 400 may include one or more general-purpose programmable central processing units (CPUs) 406A and 406B, herein generically referred to as the processor 406. In an embodiment, the computing device 400 may contain multiple processors; however, in another embodiment, the computing device 400 may alternatively be a single CPU device. Each processor 406 executes instructions stored in the memory 412.

The computing device 400 may include a bus interface unit 408 to handle communications among the processor 406, the memory 412, the display system 404, and the I/O bus interface unit 414. The I/O bus interface unit 414 may be coupled with the I/O bus 416 for transferring data to and from the various I/O units. The I/O bus interface unit 114 may communicate with multiple I/O interface units 418, 420, 422, and 424, which are also known as I/O processors (IOPs) or I/O adapters (IOAs), through the I/O bus 416. The display system 404 may include a display controller, a display memory, or both. The display controller may provide video, audio, or both types of data to a display device 402. The display memory may be a dedicated memory for buffering video data. The display system 104 may be coupled with a display device 402, such as a standalone display screen, computer monitor, television, a tablet or handheld device display, or another other displayable device. In an embodiment, the display device 102 may include one or more speakers for rendering audio. Alternatively, one or more speakers for rendering audio may be coupled with an I/O interface unit. In alternate embodiments, one or more functions provided by the display system 404 may be on board an integrated circuit that also includes the processor 406. In addition, one or more of the functions provided by the bus interface unit 408 may be on board an integrated circuit that also includes the processor 406.

The I/O interface units support communication with a variety of storage and I/O devices. For example, the terminal interface unit 418 supports the attachment of one or more user I/O devices, which may include user output devices (such as a video display devices, speaker, and/or television set) and user input devices (such as a keyboard, mouse, keypad, touchpad, trackball, buttons, light pen, or other pointing devices). A user may manipulate the user input devices using a user interface, in order to provide input data and commands to the user I/O device 426 and the computing device 400, may receive output data via the user output devices. For example, a user interface may be presented via the user I/O device 426, such as displayed on a display device, played via a speaker, or printed via a printer.

The storage interface 420 supports the attachment of one or more disk drives or direct access storage devices 428 (which are typically rotating magnetic disk drive storage devices, although they could alternatively be other storage devices, including arrays of disk drives configured to appear as a single large storage device to a host computer, or solid-state drives, such as a flash memory). In another embodiment, the storage device 428 may be implemented via any type of secondary storage device. The contents of the memory 412, or any portion thereof, may be stored to and retrieved from the storage device 428 as needed. The I/O device interface 422 provides an interface to any of various other I/O devices or devices of other types, such as printers or fax machines. The network interface 424 provides one or more communication paths from the computing device 400 to other digital devices and computer systems.

Although the computing device 400 shown in FIG. 4 illustrates a particular bus structure providing a direct communication path among the processors 406, the memory 412, the bus interface 408, the display system 404, and the I/O bus interface unit 414, in alternative embodiments the computing device 400 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 414 and the I/O bus 408 are shown as single respective units, the computing device 400, may include multiple I/O bus interface units 414 and/or multiple I/O buses 416. While multiple I/O interface units are shown, which separate the I/O bus 416 from various communication paths running to the various I/O devices, in other embodiments, some or all of the I/O devices are connected directly to one or more system I/O buses.

In various embodiments, the computing device 400 is a multi-user mainframe computer system, a single-user system, or a server computer or similar device that has little or no direct user interface, but receives requests from other computer systems (clients). In other embodiments, the computing device 400 may be implemented as a desktop computer, portable computer, laptop or notebook computer, tablet computer, pocket computer, telephone, smart phone, or any other suitable type of electronic device.

In an embodiment, the memory 412 may include a random-access semiconductor memory, storage device, or storage medium (either volatile or non-volatile) for storing or encoding data and programs. In another embodiment, the memory 412 represents the entire virtual memory of the computing device 400, and may also include the virtual memory of other computer systems coupled to the computing device 400 or connected via a network 430. The memory 412 may be a single monolithic entity, but in other embodiments the memory 412 may include a hierarchy of caches and other memory devices. For example, memory may exist in multiple levels of caches, and these caches may be further divided by function, so that one cache holds instructions while another holds non-instruction data, which is used by the processor. Memory 412 may be further distributed and associated with different CPUs or sets of CPUs, as is known in any various so-called non-uniform memory access (NUMA) computer architectures.

The memory 412 may store all or a portion of the components and data shown in FIG. 1-3. For example, the memory 412 may include a monitoring application 412A and a database or database management application 412B. The monitoring application 412A may include computer code executable by the process 406 to implement or otherwise carryout or execute the operations for passively intercepting and inspecting messages of an encrypted communication session, as described herein. The database application 412B may include computer code executable by the processor 406 to store and retrieve session contexts and associated information indexed by session context identifiers derived from or based on a TLS session ID or encrypted session ticket. These programs and data structures are illustrated in FIG. 1-3 as being included within the memory 412 in the computing device 400; however, in other embodiments, some or all of them may be on different computer systems and may be accessed remotely, e.g., via a network 430. The computing device 400 may use virtual addressing mechanisms that allow the programs of the computing device 400 to behave as if they only have access to a large, single storage entity instead of access to multiple, smaller storage entities. Thus, while the components and data shown in FIG. 1-3 are illustrated as being included within the memory 412, these components and data are not necessarily all completely contained in the same storage device at the same time. Although the components and data shown in FIG. 1-3 are illustrated as being separate entities, in other embodiments some of them, portions of some of them, or all of them may be packaged together.

In an embodiment, the components and data shown in FIG. 1-3 may include instructions or statements that execute on the processor 406 or instructions or statements that are interpreted by instructions or statements that execute the processor 406 to carry out the functions as further described below. In another embodiment, the components shown in FIG. 1-3 may be implemented in hardware via semiconductor devices, chips, logical gates, circuits, circuit cards, and/or other physical hardware devices in lieu of, or in addition to, a processor-based system. In an embodiment, the components shown in FIG. 1-3 may include data in addition to instructions or statements.

FIG. 4 is intended to depict representative components of the computing device 400. Individual components, however, may have greater complexity than represented in FIG. 4. In FIG. 4, components other than or in addition to those shown may be present, and the number, type, and configuration of such components may vary. Several particular examples of additional complexity or additional variations are disclosed herein; these are by way of example only and are not necessarily the only such variations. The various program components illustrated in FIG. 4 may be implemented, in various embodiments, in a number of different ways, including using various computer applications, routines, components, programs, objects, modules, data structures etc., which may be referred to herein as "software," "computer programs," or simply "programs."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for monitoring encrypted communication sessions between computing devices, comprising:
    observing first messages of a handshaking procedure between a client device and a first server device, the handshaking procedure establishing an encrypted communication session between the client and first server devices;
    determining, from the first messages, a session context for the encrypted communication session and an identifier associated with the session context;
    storing the session context in a server database indexed by the identifier;
    observing, subsequent to the storing, resumption messages of a resumption handshaking procedure between the client device and a second server device, the resumption handshaking procedure resuming the encrypted communication session after an interruption, wherein the server database is accessible to the first server device and the second server device,
        wherein the second server participates in the resumption handshaking procedure in the pace of the first server;
    determining that the resumption messages include the identifier associated with the session context;
    retrieving, from the server database, the session context using the identifier; and
    monitoring the resumed encrypted communication session using the session context.

2. The method of claim 1, wherein the identifier includes at least one of a transport layer security (TLS) session identifier, and a TLS session ticket.

3. The method of claim 1, wherein the identifier includes a hash of at least one of a transport layer security (TLS) session identifier, and a TLS session ticket.

4. The method of claim 1, wherein the monitoring includes:
    observing encrypted messages communicated between client and server devices; and
    decrypting the intercepted encrypted messages based on the retrieved session context.

5. The method of claim 1, wherein the session context includes at least one of an encryption cipher suite, an encryption key, and transport layer security extension information.

6. The method of claim 1, wherein first server device and the second server device are a same device.

7. The method of claim 1, wherein the identifier includes encrypted information.

8. A system comprising:
    one or more computing nodes having a memory and a processor; and a computer readable storage medium of the one or more computing nodes having program instructions embodied therewith, the program instructions executable by the processor to cause the system to:
observe first messages of a handshaking procedure between a client device and a first server device, the handshaking procedure establishing an encrypted communication session between the client and first server devices;
determine, from the first messages, a session context for the encrypted communication session and an identifier associated with the session context;
store the session context in a server database indexed by the identifier;
observe, subsequent to the storing, resumption messages of a resumption handshaking procedure between the client device and a second server device, the resumption handshaking procedure resuming the encrypted communication session after an interruption,
wherein the server database is accessible to the first server device and the second server device,
wherein the second server participates in the resumption handshaking procedure in place of the first server;
determine that the resumption messages include the identifier associated with the session context;
retrieve, from the server database, the session context; and
monitor the resumed encrypted communication session using the session context.

9. The system of claim 8, wherein the identifier includes at least one of a transport layer security (TLS) session identifier, and a TLS session ticket.

10. The system of claim 8, wherein the identifier includes a hash of at least one of a transport layer security session identifier, and a TLS session ticket.

11. The system of claim 8, wherein the program instructions are further executable by the processor to cause the system to:
observe encrypted messages communicated between client and server devices; and
decrypt the observed encrypted messages based on the retrieved session context.

12. The system of claim 8, wherein the session context includes at least one of an encryption cipher suite, an encryption key, and transport layer security extension information.

13. The system of claim 8, wherein first server device and the second server device are a same device.

14. The system of claim 8, wherein the identifier includes encrypted information.

15. A computer program product monitoring an encrypted communication session between computing devices, the computer program product including a computer readable storage medium having program instructions embodied therewith, wherein the computer readable storage medium is not a transitory signal per se, the program instructions executable by a processing circuit to cause the processing circuit to perform a method comprising:
observing first messages of a handshaking procedure between a client device and a first server device, the handshaking procedure establishing an encrypted communication session between the client and first server devices;
determining, from the first messages, a session context for the encrypted communication session and an identifier associated with the session context;
storing the session context in a server database indexed by the identifier;
observing, subsequent to the storing, resumption messages of a resumption handshaking procedure between the client device and a second server device, the resumption handshaking procedure resuming the encrypted communication session after an interruption,
wherein the server database is accessible to the first server device and the second server device,
wherein the second server participates in the resumption handshaking procedure in place of the first server;
determining that the resumption messages include the identifier associated with the session context;
retrieving, from the server database, the session context; and
monitoring the resumed encrypted communication session using the session context.

16. The computer program product of claim 15, wherein the identifier includes at least one of a transport layer security (TLS) session identifier, and a TLS session ticket.

17. The computer program product of claim 15, wherein the identifier includes a hash of at least one of a transport layer security (TLS) session identifier, and a TLS session ticket.

18. The computer program product of claim 15, wherein the monitoring includes: observing encrypted messages communicated between client and server devices; and decrypting the observed encrypted messages based on the retrieved session context.

19. The computer program product of claim 15, wherein the session context includes at least one of an encryption cipher suite, an encryption key, and transport layer security extension information.

20. The computer program product of claim 15, wherein first server device and the second server device are a same device.

* * * * *